Aug. 28, 1945. H. M. LOUDEN ET AL 2,383,556
MOLD LOCK
Filed June 3, 1942 5 Sheets-Sheet 2

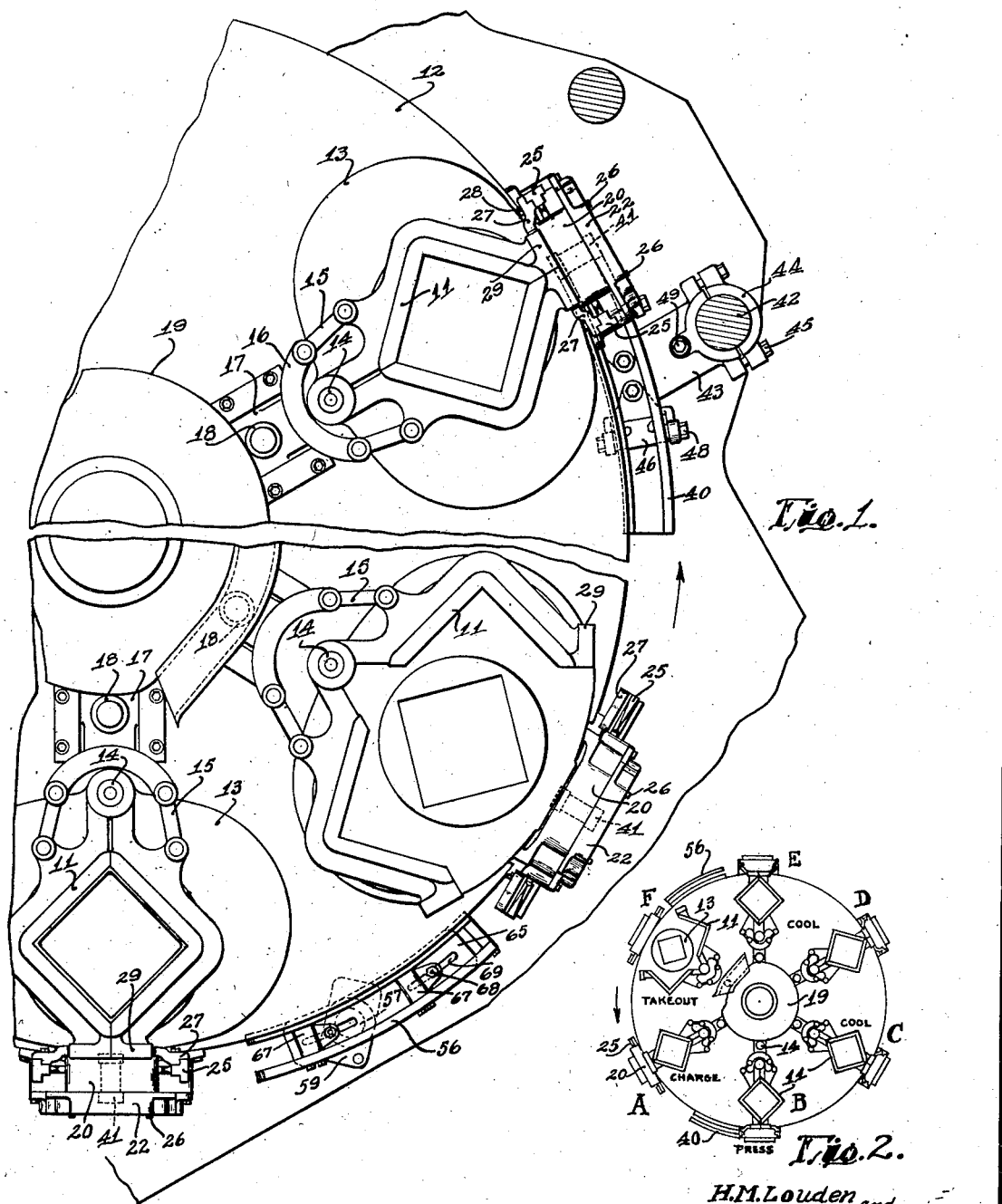

H.M. Louden and
C.W. McCreery
INVENTOR

BY Rule & Hoge
ATTORNEYS

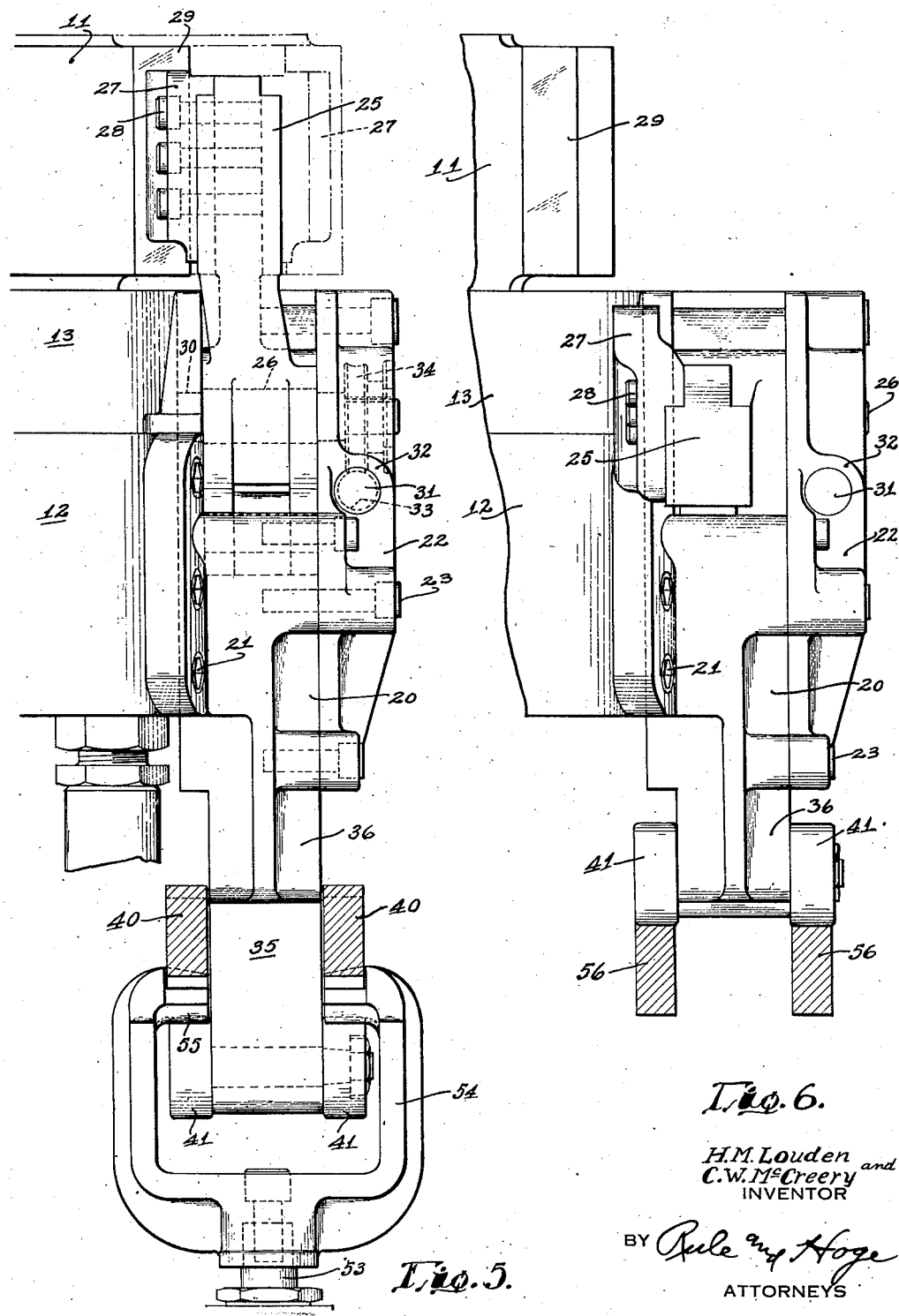

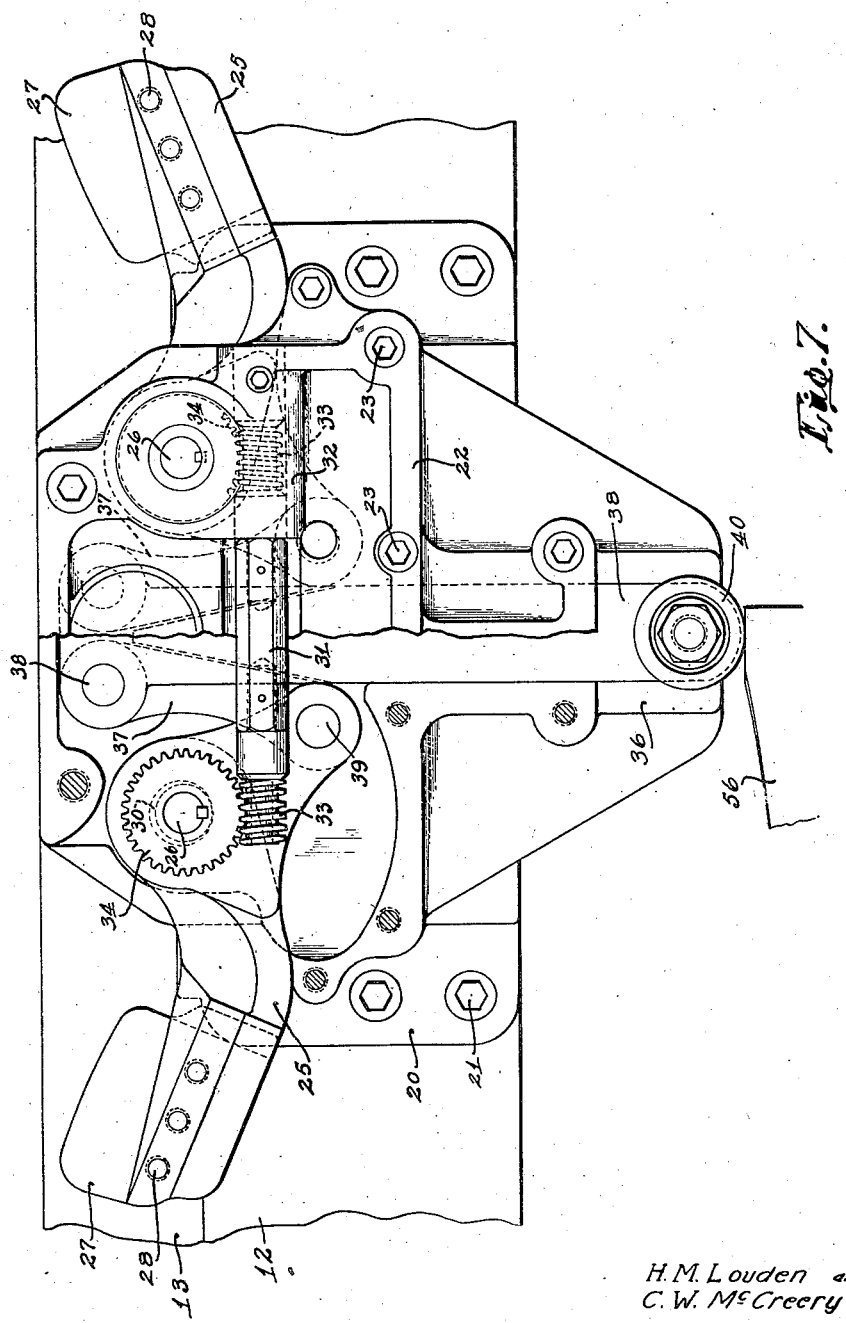

Aug. 28, 1945.    H. M. LOUDEN ET AL    2,383,556
MOLD LOCK
Filed June 3, 1942    5 Sheets-Sheet 5
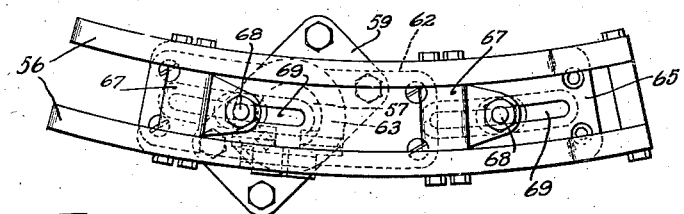
Fig. 8.
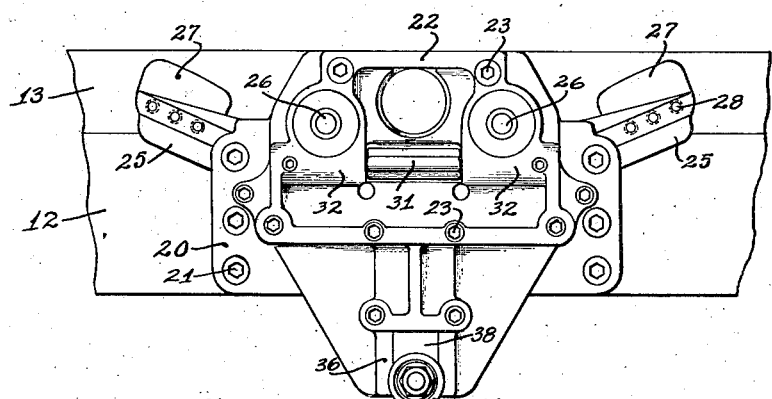
Fig. 9.
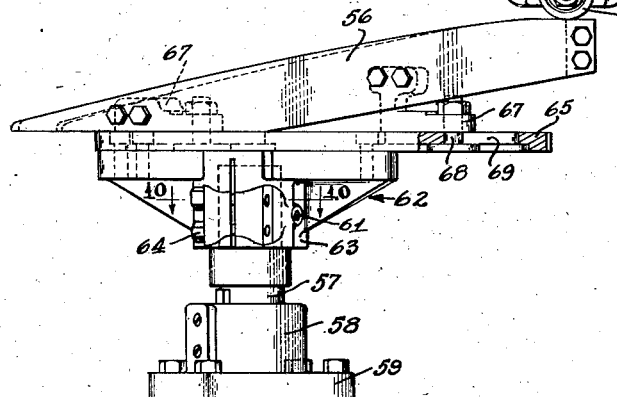
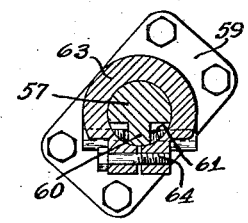
Fig. 10.
H.M. Louden and
C.W.M°Creery
INVENTOR
BY *Rule and Hoge*
ATTORNEYS Patented Aug. 28, 1945

2,383,556

UNITED STATES PATENT OFFICE 2,383,556

MOLD LOCK

Harry M. Louden, Columbus, Ohio, and Cecil W. McCreery, Muncie, Ind., assignors to Owens-Illinois Glass Company, a corporation of Ohio Application June 3, 1942, Serial No. 445,580

15 Claims. (Cl. 49—14)

Our invention relates to mechanism for clamping and locking mold sections together for securely holding them while the mold is subjected to internal pressure during molding operations. The invention in its preferred form as herein illustrated relates particularly to automatic mold clamping and locking devices for clamping together the mold halves of split molds on a press molding machine for molding glass articles, but which devices may be adapted to various other types of molds and molding operations.

Press molding machines of the split mold type used for molding hollow glass blocks and various other articles are commonly provided with clamping devices for clamping the split molds in closed position during the pressing operation, as the inner mold walls are subjected to high pressure tending to separate the mold sections. Such clamping devices are usually withdrawn with the press plunger.

An object of the present invention is to provide mold clamping and locking means by which the mold is securely locked in position for a certain time interval after the press plunger has been withdrawn and while the glass or other molded material is cooling or setting so that it can retain its shape independently of the mold.

A further object of the invention is to provide a simple and practical form of mold locking means adapted for use on various types and designs of press mold machines comprising automatically operated split molds.

A further object of the invention is to provide a compact, simple, mold locking means of adequate strength and readily adaptable to various existing forms of press molding equipment without necessitating any major alterations to permit its attachment.

A further object of the invention is to provide a practical form of mold clamping mechanism which will not interfere with the usual mold charging operations nor with the usual take-out mechanisms, either automatic or hand operated, for removing the completed articles from the machine.

Other objects of the invention will appear hereinafter.

Referring to the accompanying drawings:

Fig. 1 is a fragmentary part sectional plan view of a press molding machine of the split mold type to which the present invention is applied, a portion of the mold table being broken away to permit the take-out and press molding stations to be shown in comparatively close relation;

Fig. 2 is a diagrammatic view of the machine;

Fig. 5 is a view showing the mold clamping mechanism in a side elevation, the mold closing cam being shown in section;

Fig. 6 is a view similar to Fig. 5 but with the mold clamp in open position;

Fig. 7 is a front elevation of the mold clamping and locking mechanism with the clamping arms in open position, the left hand half of the cover plate for the gearing being broken away;

Fig. 8 is a plan of the cam for opening the clamping arms;

Fig. 9 is a front elevation at the mold opening station showing the means for opening the mold clamping arms; and Fig. 10 is a section at the line 10—10 on Fig. 9.

Figure 3:
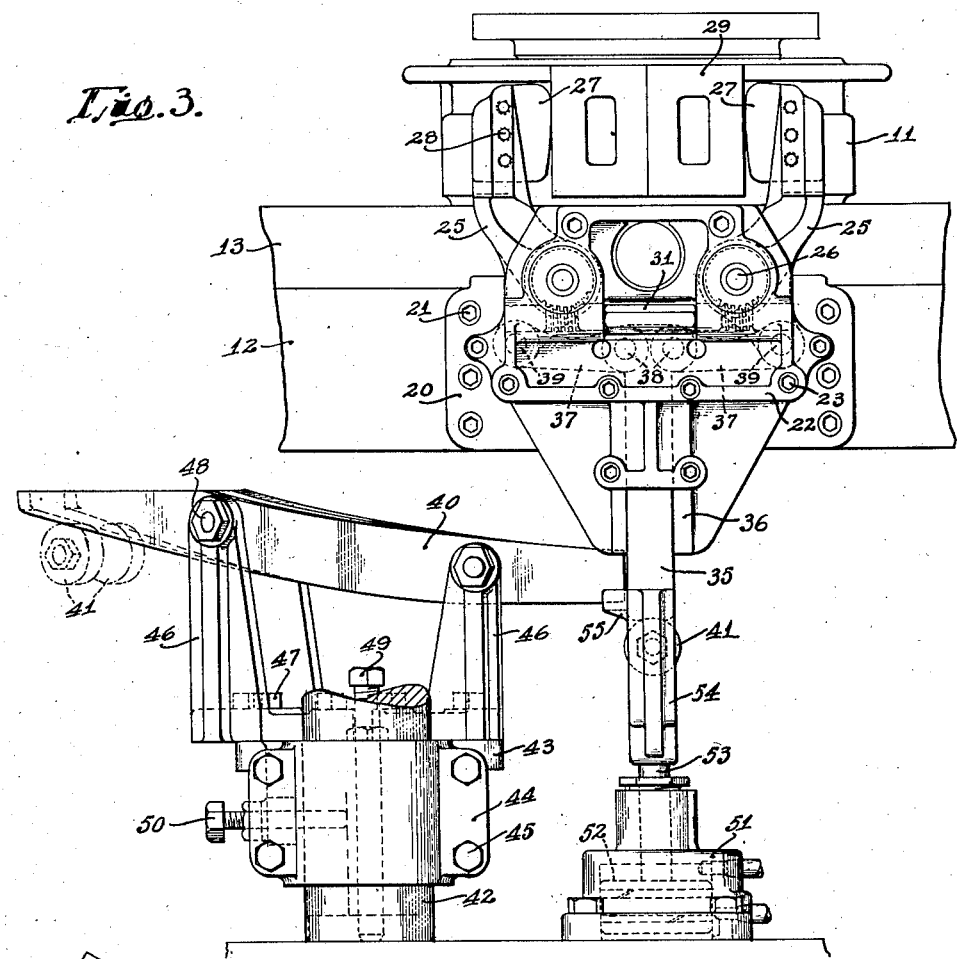
Fig. 3 is an elevation showing a mold locked in closed position at the press molding station.
Figure 4:
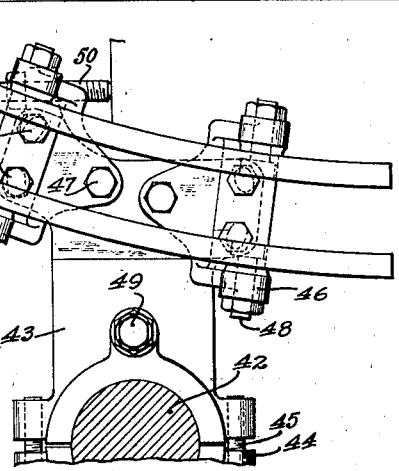
Fig. 4 is a sectional plan showing the mold closing cam.

The present invention is a modification of or improvement on that disclosed in Patent No. 2,304,736, granted in our name December 8, 1942, for Mold lock, and is herein illustrated as applied to a standard glass block molding machine such as disclosed in said patent.

Such machine comprises an annular series of mold units each including a sectional mold 11. The mold units are mounted on a mold table 12 or carriage which may be rotated intermittently, step by step to bring the molds in succession to the different stations. These include a mold charging station A (Fig. 2) at which the mold receives a charge of molten glass, a press station B at which the charge may be molded by a press plunger, cooling stations C, D and E, and a take-out station F at which the mold is opened and the molded article removed. Each mold comprises partible sections supported on a base plate 13 and mounted to swing on a pivot pin 14. The mold sections are connected through links 15 to a yoke 16 on a slide 17 mounted for movement radially of the mold table. A cam follower roller 18 on the slide runs on a stationary cam 19 which controls the opening and closing movements of the mold sections. The above described parts are conventional and in themselves form no part of the present invention.

The novel mold clamping and locking mechanism comprised in the present invention will now be described. Such mechanism includes pairs of clamping devices individual to the molds and mounted on the mold table 12 for rotation therewith. Each mold clamping unit includes a supporting frame 20 attached to the mold or carriage by means of bolts 21, said frame also forming a gear casing within which portions of the gearing are housed. The casing includes a front cover plate 22 removably attached by bolts 23.

The mold sections are clamped and locked in closed position by a pair of clamping arms 25. These arms are mounted to swing on pivot pins in the form of shafts 26 mounted in the casing 20. The arms 25 carry pads 27 removably attached thereto by screw bolts 28, the pads being arranged to engage extensions 29 formed on the outer ends of the mold sections. The pads may be mounted on either the front or rear faces of the arms 25 as indicated respectively in broken and full lines on Fig. 5, being thus adapted for use with molds of different sizes or lengths.

The pivot shafts 26 are formed with eccentric bearing end portions 30 (Figs. 5 and 7) journalled in the frame 20 and are rotatively adjustable for shifting the fulcrums of the clamping arms and thereby adjusting the clamping positions of the holding pads 27. This adjustment permits the mold sections to be accurately and securely locked in closed position. The means for adjusting the pivot shafts includes an adjusting shaft 31 journalled in bearings 32 which may be formed in the cover plate 22. The adjusting shaft is formed at its ends with right and left hand screw threads or worms 33 which engage worm gears 34 keyed to the pivot shafts 26. The shaft 31 may be rotated as by means of a wrench for rotating the gears 34 and shafts 26.

Means for swinging the clamping arms 25 about their fulcrums includes a vertical slide bar 35 mounted to reciprocate vertically in slideways 36. Links 37 are connected by pivots 38 to the upper end of the slide bar 35 and by pivots 39 to the clamping arms 25. The slide bar is moved downward for swinging the arms 25 toward clamping position by means of stationary cams 40 in the form of a pair of parallel inclined bars extending circumferentially of the mold table. The under surfaces of the bars 40 provide cam tracks on which run cam follower rolls 41 mounted on the lower end of the slide bar 35. The cam tracks 40 are supported on a stationary post 42 which may be mounted on the machine base. A main supporting bracket 43 is clamped to the post by means of a strap 44 and clamping screws 45. A pair of U-shaped brackets 46 are attached by bolts 47 to the main bracket 43. The bars 40 are secured to the brackets 46 by bolts 48. The bracket 43 and parts carried thereby are adjustable up and down by means of an adjusting rod 49 having screw threaded connection with the bracket 43 and bearing at its lower end on the machine base. By loosening the screws 45 the bracket 43 and the cam tracks may be adjusted vertically. An adjustable stop rod 50 provides means for determining the position of adjustment of the cams about the axis of the shaft 42.

When the mold carriage is indexed to bring a mold to the pressing station B (Fig. 3), the slide bar 35 travels between the cam tracks and the cam follower rolls 41 run on the lower surfaces of the cam tracks, thereby drawing the slide bar downward and swinging the clamping arms upward toward mold clamping position. The cam rolls run off the track just before the mold is brought to rest at the pressing station. The final clamping movement is effected after the mold is brought to rest, by means of an air-operated piston motor 51. Said motor comprises a vertically movable piston 52 and piston rod 53. A yoke 54 attached to the upper end of the piston rod is formed at its upper end with inwardly projecting lugs 55. When the rolls 41 run off the cam tracks they are brought beneath the lugs 55 as the mold carriage is brought to rest. Air pressure is then supplied to the motor for lowering the piston, thereby causing the yoke 54 to draw bar 35 downward and complete the closing movement of the clamping arms 25.

There is a toggle action of the links or arms 37 which are about in alignment as shown in Fig. 3 when the arms 25 are in clamping position and provide a toggle joint between the clamping arms. The parts are so adjusted that the pivots 38 are carried slightly below the dead center line of the pivots 39 when the motor piston 52 is lowered. The arms 25 are then held in locked-in position independently of pressure applied thru the motor. When a mold has thus been locked at the pressing station the charge of glass which has been introduced at the charging station A is molded by the usual press plunger operation. The mold remains locked during succeeding step movements of the carriage by which the mold is passed thru cooling stations C, D and E.

As the carriage is indexed for moving the mold from station E to the take-out station F the locking arms 25 are swung to open position for releasing the mold which is then opened. The means for lifting the slide bar 35 and unlocking the mold, shown in Figs. 8 to 10, includes a pair of parallel cam tracks 56 positioned a short distance in advance of the take-out station F. The tracks are arranged concentrically with the mold table and are inclined forwardly and upwardly, being positioned beneath the path of the cam follower rolls 41. A stationary post 57 provides a mounting for the cam tracks. Said post is mounted for vertical adjustment in a bearing 58 which may be formed on a bearing block 59 bolted to the machine base. The post 57 is formed with a vertical rib 60. Set screws 61 hold the post in its adjusted position. A bracket 62 including a split bearing sleeve 63 is mounted on the post 57, being rotatively adjustable thereon and held in position by clamping screws 64. Mounted on the bracket 62 is a horizontal plate 65 which supports the tracks 56. Brackets 67 bolted to the tracks are attached to the plate 65 by clamping bolts 68 which engage elongated slots 69 in said plate thereby permitting adjustment of the tracks circumferentially of the mold table. During the indexing movement of the mold table by which a mold is advanced from station E (Fig. 2) to the take-out station F, the rolls 41 run upwardly along the inclined cam tracks 56 thereby lifting the slide bar 35 and swinging the clamping arms to open position. As soon as this movement has commenced and the pivots 38 are carried above the dead center position so that the toggle lock is broken, the clamping arms are released and the mold sections are left free for their opening movement which is effected by the stationary cam 19 as heretofore described.

Modifications may be resorted to within the spirit and scope of our invention as defined in the appended claims.

We claim:

1. A press molding machine comprising a mold carriage mounted for rotation about a vertical axis, a mold on said carriage comprising partible sections, a pair of mold clamping arms pivotally mounted on the carriage for swinging movement to and from a mold clamping position, a stationary cam, means actuated by the cam during the travel of the mold carriage to swing said clamping arms to mold clamping position, and means cooperating with the cam to lock said arms in mold clamping position and hold them locked after they have been carried beyond the control of said cam.

2. A press molding machine comprising a mold carriage mounted for rotation about a vertical axis, a mold on said carriage comprising partible sections, a pair of mold clamping arms pivotally mounted on the carriage for swinging movement to and from a mold clamping position, a slide bar, a pair of links each pivoted at one end to the slide bar and at its opposite end to a said clamping arm, said links forming operating connections between the slide bar and clamping arms for swinging the latter to mold clamping position, said links forming a toggle joint between said arms with the links about in line when the said arms are in mold clamping position, a stationary cam track, a cam follower roll connected to said slide bar and running on the cam track, and means cooperating with the cam track to swing the links past the dead center line and lock the said arms in mold clamping position.

3. A press molding machine comprising a mold carriage mounted for rotation about a vertical axis, a mold on said carriage comprising partible sections, a pair of mold clamping arms pivotally mounted on the carriage for swinging movement to and from a mold clamping position, a slide bar, a pair of links each pivoted at one end to the slide bar and at its opposite end to a said clamping arm, said links forming operating connections between the slide bar and clamping arms for swinging the latter to mold clamping position, said links forming a toggle joint between said arms with the links about in line when the said arms are in mold clamping position, a stationary cam track, a cam follower roll connected to said slide bar and running on the cam track, said cam track being positioned and shaped to move the slide bar to an intermediate position during the travel of the mold carriage, a piston motor, and means providing an operating connection between said motor and the slide bar for completing the movement of said slide bar and bringing the clamping arms to mold clamping position.

4. The combination of a mold carriage mounted for intermittent rotation about a vertical axis, a mold comprising partible sections mounted on the carriage for swinging movement to and from a closed position, mold clamping arms pivoted on the carriage for swinging movement to and from a mold clamping position, a cam track having a stationary mounting separate from the mold carriage, means actuated by the cam track for swinging the clamping arms toward mold clamping position during the travel of the mold carriage, a motor, and means actuated thereby for completing the movement of said arms to mold clamping position after the carriage has come to rest with said cam actuated means in a position beyond the control of the said cam track.

5. The combination of a mold carriage mounted for rotation intermittently step by step about a vertical axis, a mold mounted on the carriage and comprising partible sections hinged to swing to and from a mold closing position, said mold being brought by the movement of the carriage to pressing and take-out stations, means for closing the mold and holding it closed while at the pressing station, said means comprising a pair of clamping arms, a pair of toggle links connected to said arms, a stationary cam track separate from the carriage, a cam follower roller, a slide bar slidably mounted on the carriage and carrying said roller and connected to said toggle links, said cam track being positioned and shaped to engage said roller and operate said slide bar and swing the clamping arms toward their clamping position as the mold approaches the pressing station, and a second stationary cam track positioned in the path of the said roller and operative to swing the clamping arms to a mold releasing position as the mold approaches the take-out station.

6. A press molding machine comprising a mold carriage, means for rotating it, a mold on the carriage, said mold comprising partible sections, means for moving said sections to and from each other, means for clamping the mold sections together comprising a pair of clamping arms pivoted on the carriage, means for swinging said arms to mold clamping position, including a pair of links connected to said arms and forming a toggle joint, said links being movable past a dead center line to lock the toggle and thereby lock the clamping arms in mold clamping position, an operating device mounted independently of the mold carriage, and means actuated by said operating device for swinging said links to said toggle locking position and thereby swinging said arms to a mold clamping position and causing the toggle to hold said arms in clamping position independently of the said operating device.

7. A press molding machine comprising a mold carriage, means for rotating it, a mold on the carriage, said mold comprising partible sections, means for moving said sections to and from each other, means for clamping the mold sections together comprising a pair of clamping arms mounted on the carriage for swinging movement, means for swinging said arms to mold clamping position, including a pair of links connected to said arms and forming a toggle joint, said links being movable past a dead center line to lock the toggle and thereby lock the clamping arms in mold clamping position, a power motor mounted separately from the mold carriage, and means providing operating connections between the motor and said links for swinging the said arms to mold clamping position and moving the links past the dead center position for holding the mold clamped independently of the motor.

8. A press molding machine comprising a mold carriage rotatable about a vertical axis, a mold on the carriage comprising partible sections, clamping arms, pivot pins on the carriage on which said arms are mounted to swing to and from a mold clamping position, links pivoted to said arms and forming a toggle joint between the arms, an operating device having a stationary mounting separate from the mold carriage, means actuated by said device for swinging said links to a dead center position and thereby swinging said arms to mold clamping position, and means for adjusting the said pivot pins toward and from each other and thereby adjusting the clamping arms to the mold sections.

9. A press molding machine comprising a mold carriage rotatable about a vertical axis, a mold on the carriage comprising partible mold sections, clamping arms, pivot pins on the carriage on which said arms are mounted to swing to and from a mold clamping position, links pivoted to said arms and forming a toggle joint between the arms, an operating device having a stationary mounting separate from the mold carriage, and means providing operating connections between said device and said links and operable by said device to swing the links to a dead center position and thereby swing said arms to mold clamping position, and means for adjusting the said pivot pins toward and from each other and thereby adjusting the clamping arms to the mold sections, said adjusting means comprising eccentric bearings for the pivots, and means for rotatively adjusting the pivots in their bearings.

10. A press molding machine comprising, in combination, a mold carriage rotatable about an axis, a mold comprising sections hinged on the carriage to swing to and from a closed position, a pair of mold clamping and locking arms, horizontal pivot pins on the carriage on which said arms are mounted to swing to and from a mold clamping position, links pivoted at their outer ends to said arms and extending inwardly toward each other, a vertical slide bar mounted for up and down sliding movement on the carriage, the inner ends of the links being pivoted to said slide bar, a piston motor comprising a vertically reciprocating piston, and means on the carriage brought into operative relation to said piston by the rotation of the carriage and providing operating connections between the piston and slide bar.

11. A press molding machine comprising, in combination, a mold carriage rotatable about an axis, a mold comprising sections hinged on the carriage to swing to and from a closed position, a pair of mold clamping and locking arms, horizontal pivot pins on the carriage on which said arms are mounted to swing to and from a mold clamping position, links pivoted at their outer ends to said arms and extending inwardly toward each other, a vertical slide bar mounted for up and down sliding movement on the carriage, the inner ends of the links being pivoted to said slide bar and the links with said bar forming a toggle between said arms, a piston motor comprising a vertically reciprocating piston, and means on the carriage brought into operative relation to said piston by the rotation of the carriage and providing operating connections between the piston and slide bar, the parts being arranged to move the links a short distance beyond the dead center line of the toggle joint formed by said links when the motor is operated and thereby hold the clamping arms in mold clamping position independently of the piston motor while the latter is disconnected from the slide bar.

12. A press molding machine comprising a mold carriage mounted for rotation about a vertical axis, a mold on the carriage comprising partible sections, a pair of mold clamping arms, horizontal pivots on the mold carriage below the mold and on which said clamping arms are pivotally mounted for up-and-down swinging movement into and out of a mold clamping position in which they engage the mold sections and clamp the mold closed, a pair of links having outer ends pivoted to the clamping arms, a vertical slide bar to which the inner ends of the links are pivoted, means on the mold carriage providing a vertical slideway in which the slide bar is mounted for up-and-down sliding movement, and means having a stationary mounting separate from the mold carriage for moving the slide bar vertically and thereby swinging the mold clamping arms.

13. A press molding machine comprising a mold carriage mounted for rotation about a vertical axis, a mold on the carriage comprising partible sections, a pair of mold clamping arms, horizontal pivots on the mold carriage below the mold and on which said clamping arms are pivotally mounted for up-and-down swinging movement into and out of a mold clamping position in which they engage the mold sections and clamp the mold closed, a pair of links having outer ends pivoted to the clamping arms, a vertical slide bar to which the inner ends of the links are pivoted, means on the mold carriage providing a vertical slideway in which the slide bar is mounted for up-and-down sliding movement, a cam track having a stationary mounting separate from the mold carriage, and a cam follower roll on said slide bar, said cam track being positioned to engage said roll and cause the latter to run thereon and thereby move the slide bar vertically during the travel of the carriage.

14. A press molding machine comprising a mold carriage mounted for rotation about a vertical axis, a mold on the carriage comprising partible sections, a pair of mold clamping arms, horizontal pivots on the mold carriage below the mold and on which said clamping arms are pivotally mounted for up-and-down swinging movement into and out of a mold clamping position in which they engage the mold sections and clamp the mold closed, a pair of links having outer ends pivoted to the clamping arms, a vertical slide bar to which the inner ends of the links are pivoted, means on the mold carriage providing a vertical slideway in which the slide bar is mounted for up-and-down sliding movement, cams having a stationary mounting and extending along the path of travel of the slide bar with the carriage, said cams being inclined respectively in a downward and forward direction and an upward and forward direction, and means on the slide bar to run on the cams and cause the latter to swing the said arms to and from mold clamping position.

15. A press molding machine comprising a mold carriage mounted for rotation about a vertical axis, a mold on the carriage comprising partible sections, a pair of mold clamping arms, horizontal pivots on the mold carriage below the mold and on which said clamping arms are pivotally mounted for up-and-down swinging movement into and out of a mold clamping position in which they engage the mold sections and clamp the mold closed, said mold clamping arms extending downwardly below their pivots, a pair of links pivoted at their outer ends to said extensions, a slide bar mounted on the carriage for up-and-down sliding movement, with its upper end between said arms, the inner ends of the links being pivoted to the upper end of the slide bar, means for moving the slide bar downward and thereby swinging the mold clamping arms outwardly for releasing the mold, means for moving the slide bar upwardly and thereby swinging the clamping arms to mold clamping position, and means for arresting the slide bar in an upward position in which the links form a locked toggle and hold the clamping arms locked in clamping position.

HARRY M. LOUDEN.
CECIL W. McCREERY.